(12) United States Patent
Moriguchi

(10) Patent No.: US 10,161,751 B2
(45) Date of Patent: Dec. 25, 2018

(54) VIBRATION-TYPE ANGULAR RATE SENSOR

(71) Applicant: Sumitomo Precision Products Co., Ltd., Amagasaki-shi, Hyogo (JP)

(72) Inventor: Takafumi Moriguchi, Amagasaki (JP)

(73) Assignee: Sumitomo Precision Products Co., Ltd., Amagasaki-shi (JP)

( * ) Notice: Subject to any disclaimer, the term of this patent is extended or adjusted under 35 U.S.C. 154(b) by 233 days.

(21) Appl. No.: 15/121,426

(22) PCT Filed: Feb. 12, 2015

(86) PCT No.: PCT/JP2015/053815
§ 371 (c)(1),
(2) Date: Aug. 25, 2016

(87) PCT Pub. No.: WO2015/129464
PCT Pub. Date: Sep. 3, 2015

(65) Prior Publication Data
US 2016/0377433 A1    Dec. 29, 2016

(30) Foreign Application Priority Data

Feb. 26, 2014   (JP) ................. 2014-034906

(51) Int. Cl.
*G01C 19/5677*     (2012.01)
(52) U.S. Cl.
CPC ................. *G01C 19/5677* (2013.01)
(58) Field of Classification Search
CPC ..... G01C 19/5677; G01C 17/38; G01C 21/28
See application file for complete search history.

(56) References Cited

U.S. PATENT DOCUMENTS

| 5,235,514 | A | * | 8/1993 | Matsuzaki | ............. G01C 21/28 340/995.28 |
| 5,806,364 | A | | 9/1998 | Kato et al. | |
| 6,698,271 | B1 | | 3/2004 | Fell et al. | |
| 8,347,718 | B2 | * | 1/2013 | Malvern | ............ G01C 19/5677 73/504.12 |
| 2006/0260382 | A1 | | 11/2006 | Fell et al. | |
| 2009/0151452 | A1 | | 6/2009 | Mayer-Wegelin et al. | |

FOREIGN PATENT DOCUMENTS

| JP | 9-170927 A | 6/1997 |
| JP | 2000-221040 A | 8/2000 |
| JP | 2001-509588 A | 7/2001 |
| JP | 2005-127841 A | 5/2005 |
| JP | 2007-520716 A | 7/2007 |
| JP | 2007-255890 A | 10/2007 |
| JP | 2008-224230 A | 9/2008 |

OTHER PUBLICATIONS

International Search Report (PCT/ISA/210) issued in PCT Application No. PCT/JP2015/053815 dated Mar. 31, 2015 with English translation (five pages).
Japanese-language Written Opinion (PCT/ISA/237) issued in PCT Application No. PCT/JP2015/053815 dated Mar. 31, 2015 (five pages).

* cited by examiner

*Primary Examiner* — Elias Desta
(74) *Attorney, Agent, or Firm* — Crowell & Moring LLP

(57) ABSTRACT

This vibration-type angular rate sensor corrects a sensor output from a secondary-side control circuit by adding, to a closed control loop of the secondary-side control circuit, an offset value based on the output of a closed control loop of a primary-side control circuit dependent on temperature.

8 Claims, 5 Drawing Sheets

FIG.8

| TEMPERATURE (T) | T1 | T2 | ⋯ |
|---|---|---|---|
| OFFSET VALUE (y) | y1 | y2 | ⋯ |
| OUTPUT FROM PRIMARY-SIDE CONTROL CIRCUIT (x) | x1 | x2 | ⋯ |

VIBRATION-TYPE ANGULAR RATE SENSOR

TECHNICAL FIELD

The present invention relates to a vibration-type angular rate sensor, and more particularly, it relates to a vibration-type angular rate sensor including a primary-side control circuit that induces a primary vibration in a vibrator and a secondary-side control circuit that detects and outputs a secondary vibration generated in the vibrator due to an angular velocity applied to the vibrator.

BACKGROUND ART

A vibration-type angular rate sensor including a primary-side control circuit that excites a vibrator in a resonance mode and a secondary-side control circuit that detects and outputs an angular velocity applied to the sensor is known in general. A vibration-type angular rate sensor like this is disclosed in Japanese Translation of PCT international Application Publication No. JP-T-2001-509588, for example.

In Japanese Translation of PCT International Application Publication No. JP-T-2001-509588, there is disclosed a vibration structure sensor (vibration-type angular rate sensor) including a first pickoff means and a drive means (first drive means) that excite a vibration structure at a resonance frequency, and a second pickoff means and a drive means (second drive means) that outputs an angular rate applied to the vibration structure. The first pickoff means and the drive means are configured to vibrate the vibration structure at a constant frequency and with constant amplitude (primary vibration). When rotation (angular velocity) is applied to the vibration structure, a secondary vibration different from the primary vibration is generated. This secondary vibration is detected by the second pickoff means, and the vibration structure is driven by the second drive means, whereby an output from the pickoff means is reduced to zero, and becomes an angular velocity output in which the magnitude of an applied drive signal is detected.

In the vibration structure sensor (vibration-type angular rate sensor), the second pickoff means of the secondary vibration is arranged at a position of 135 degrees with respect to the first drive means of the primary vibration. On the other hand, a biased error caused by an alignment error ($\varepsilon r$), which is a misalignment (misalignment from 135 degrees) between the first drive means of the primary vibration and the second pickoff means of the secondary vibration, resulting from a mechanical error (manufacturing error) or the like in the vibration-type angular rate sensor may be caused. Thus, according to Japanese Translation of PCT International Application Publication No. JP-T-2001-509588, the biased error caused by the alignment error is canceled by adding an output signal (a signal not dependent on temperature) of the first pickoff means to an output signal of the second pickoff means or subtracting the output signal of the first pickoff means from the output signal of the second pickoff means. Specifically, the signal (not dependent on temperature) output from the first pickoff means is added to or subtracted from the output signal of the second pickoff means so that the bias error resulting from the mechanical error is reduced.

PRIOR ART

Patent Document

Patent Document 1: Japanese Translation of PCT International Application Publication No. JP-T-2001-509588

SUMMARY OF THE INVENTION

Problem to be Solved by the Invention

However, in the vibration-type angular rate sensor according to Japanese Translation of PCT International Application Publication No. JP-T-2001-509588, the signal output from the first pickoff means is added to or subtracted from the output signal of the second pickoff means so that the bias error resulting from the mechanical error can be reduced, but an error in a sensor output caused in a closed control loop of a secondary-side control circuit by cross talk from a primary-side control circuit to the secondary-side control circuit is not reduced. Thus, in Japanese Translation of PCT International Application Publication No. JP-T-2001-509588, there is such a problem that it is impossible to correct the sensor output to reduce the error caused by the cross talk from the primary-side control circuit to the secondary-side control circuit.

The present invention has been proposed in order to solve the aforementioned problem, and one object of the present invention is to provide a vibration-type angular rate sensor capable of correcting a sensor output to reduce an error caused by cross talk from a primary-side control circuit to a secondary-side control circuit.

Means for Solving the Problem

In order to attain the aforementioned object, a vibration-type angular rate sensor according to an aspect of the present invention includes a vibrator, a primary-side control circuit including a closed control loop, of which the output induces a primary vibration in the vibrator, and a secondary-side control circuit including a closed control loop that detects a secondary vibration generated in the vibrator due to an angular velocity applied to the vibrator, and a sensor output from the secondary-side control circuit is corrected by adding, to the closed control loop of the secondary-side control circuit, an offset value based on the output of the closed control loop of the primary-side control circuit dependent on temperature.

In the vibration-type angular rate sensor according to this aspect of the present invention, as hereinabove described, the sensor output from the secondary-side control circuit is corrected by adding the offset value based on the output of the closed control loop of the primary-side control circuit dependent on temperature to the closed control loop of the secondary-side control circuit, whereby the sensor output can be corrected to reduce an error (particularly an error inversely proportional to the second power of the gain of the vibrator) caused by cross talk from the primary-side control circuit to the secondary-side control circuit.

Furthermore, the sensor output is corrected by adding the offset value based on the output of the primary-side control circuit dependent on temperature to the closed control loop of the secondary-side control circuit, whereby the temperature properties (the temperature properties of the vibration-type angular rate sensor itself) of the gain of the control loop of the primary-side control circuit can be directly reflected as temperature information in the closed control loop of the secondary-side control circuit without using a temperature sensor. Thus, error factors, such as a difference in temperature properties and a difference in hysteresis between the temperature sensor and the vibration-type angular rate sensor, resulting from using the temperature sensor do not occur, and correction in conformity with the more actual temperature properties of the vibration-type angular rate sensor can be performed as compared with the case where the offset value is added on the basis of temperature indirectly measured by the temperature sensor. Consequently, correction can be performed without using the temperature sensor, and the accuracy of the correction can be increased.

Preferably in the aforementioned vibration-type angular rate sensor according to this aspect, the primary-side control circuit and the secondary-side control circuit include a primary-side loop filter and a secondary-side loop filter in the closed control loops, respectively, and the sensor output is corrected by adding, to the input of the secondary-side loop filter, the offset value based on the output of the primary-side loop filter dependent on temperature. The output of the closed control loop corresponds to the output of the loop filter. The output of the loop filter is inversely proportional to the gain of the vibrator dependent on temperature by the feedback operation of the closed control loop. According to the present invention, focusing on this point, the sensor output is corrected by adding the offset value based on the output of the primary-side loop filter dependent on temperature to the input of the secondary-side loop filter, whereby the output of the primary-side loop filter having properties proportional to temperature can be utilized as temperature information, and hence correction can be performed without using the temperature sensor.

Preferably in the aforementioned vibration-type angular rate sensor according to this aspect, when the sensor output is corrected in an analog manner, the sensor output is corrected by adding, to the closed control loop of the secondary-side control circuit, a first offset value based on the output of the primary-side control circuit dependent on temperature and a second offset value based on a constant signal not dependent on temperature, and adjusting the addition amounts of the first offset value and the second offset value. When the second offset value based on the constant signal not dependent on temperature is added to the closed control loop of the secondary-side control circuit, the output of the secondary-side control circuit has properties inversely proportional to the gain of the vibrator dependent on temperature. Similarly, the output of the primary-side control circuit also has properties inversely proportional to the gain of the vibrator by the feedback operation of the closed control loop, and hence the output of the secondary-side control circuit has properties inversely proportional to the second power of the gain of the vibrator by adding, to the closed control loop of the secondary-side control circuit, the first offset value based on the output of the primary-side control circuit having the properties inversely proportional to the gain of the vibrator. More specifically, the sensor output is corrected by adding the first offset value corresponding to the second power of the gain of the vibrator and the second offset value corresponding to the first power of the gain of the vibrator and adjusting the addition amounts of the first offset value and the second offset value, whereby not only the correction inversely proportional to the first power of the gain of the vibrator but also the correction inversely proportional to the second power of the gain of the vibrator can be performed, and hence the accuracy of the correction can be further increased as compared with the case where the correction inversely proportional to only the first power of the gain of the vibrator is performed.

Preferably in this case, the primary-side control circuit and the secondary-side control circuit include a primary-side loop filter and a secondary-side loop filter in the closed control loops, respectively, and the sensor output is corrected in an analog manner by adding, to the input, of the secondary-side loop filter, the first offset value based on the output of the primary-side loop filter dependent on temperature and the second offset value based on the constant signal not dependent on temperature, and adjusting the addition amounts of the first offset value and the second offset value. According to this structure, both the first offset value corresponding to the second power of the gain of the vibrator and the second offset value corresponding to the first power of the gain of the vibrator can be easily reflected in the output of the secondary-side loop filter, which is the output of the secondary-side control circuit including the closed control loop.

Preferably in the aforementioned vibration-type angular rate sensor in which the first offset value and the second offset value are added to the input of the secondary-side loop filter, the total $V_{Out\_Total\_Error}$ of an error in the sensor output caused in the closed control loop of the secondary-side control circuit by an error signal generated from a circuit block constituting the secondary-side control circuit and an error in the sensor output caused in the closed control loop of the secondary-side control circuit by cross talk from the primary-side control circuit to the secondary-side control circuit is expressed by the following expression (1) when the gain of the vibrator dependent on temperature is assumed as $G_R(T)$, and A, B, and C are assumed as constant values not dependent on temperature, and the sensor output is corrected in an analog manner by adjusting the addition amount of the first offset value based on the output of the primary-side control circuit dependent on temperature to reduce $A/G_R^2(T)$, which is a first term in the expression (1), to zero or substantially zero, and adjusting the addition amount of the second offset value based on the constant signal not dependent on temperature to reduce $B/G_R(T)$, which is a second term in the expression (1), to zero or substantially zero. According to this structure, both the primary (the first power of the gain of the vibrator) component and the secondary (the second power of the gain of the vibrator) component of the error in the sensor output can be eliminated, and hence the accuracy of the correction can be reliably increased. Although a constant value C remains, C is a constant value not dependent on temperature, and hence the error in the sensor output caused by a temperature change is not influenced. Thus, no problem occurs in the correction.

[Mathematical Expression 2]

$$V_{Out\_Total\_Error} = A \cdot \frac{1}{G_R^2(T)} + B \cdot \frac{1}{G_R(T)} + C \qquad (1)$$

Preferably in the aforementioned vibration-type angular rate sensor according to this aspect, when the sensor output is corrected in a digital manner, the sensor output is corrected by quantizing the output of the primary-side control circuit dependent on temperature, and adding, to the secondary-side control circuit, the offset value for reducing an error in the sensor output caused by a temperature change to zero or substantially zero according to the quantized output of the primary-side control circuit. According to this structure, the sensor output can be corrected simply by adding, to the secondary-side control circuit, the offset value for reducing the error in the sensor output caused by a temperature change to zero or substantially zero, and hence the structure of the vibration-type angular rate sensor can be simplified, unlike the case where an offset value other than the offset value based on the output of the primary-side control circuit dependent on temperature is added.

Preferably in this case, the sensor output is corrected in a digital manner by calculating in advance the offset value for reducing the error in the sensor output to zero or substantially zero at each temperature, determining a relational expression between the calculated offset value at each temperature and the quantized output of the primary-side control circuit at each temperature by polynomial approximation, and adding the offset value to the secondary-side control circuit on the basis of the determined relational expression. According to this structure, when correction is performed in a digital manner, the offset value can be calculated to further approximate the error in the sensor output to zero by increasing the degree of a polynomial, and hence the accuracy of the correction can be further increased. Furthermore, it is not necessary to separately provide a circuit or the like to remove the constant value C, unlike the case where the constant value C in the expression (1) remains when correction is performed in an analog manner, as described above, and hence the structure of the vibration-type angular rate sensor can be simplified also in this regard.

Preferably in the aforementioned vibration-type angular rate sensor according to this aspect, the vibrator includes a ring-type vibrator. The ring-type vibrator has a symmetrical shape, and hence a vibration mode in the primary-side control circuit and a vibration mode in the secondary-side control circuit are similar to each other. Thus, when the present invention is applied to the vibration-type angular rate sensor including the ring-type vibrator, it is not necessary to take into account the influence of a difference between the vibration modes, and hence the sensor output can be easily corrected.

Effect of the Invention

According to the present invention, as hereinabove described, the sensor output can be corrected to reduce the error caused by the cross talk from the primary-side control circuit to the secondary-side control circuit.

BRIEF DESCRIPTION OF THE DRAWINGS

[FIG. 8] A diagram for illustrating correction of sensor output of the vibration-type angular rate sensor according to the second embodiment of the present invention.

MODES FOR CARRYING OUT THE INVENTION

Embodiments of the present invention are hereinafter described on the basis of the drawings.

First Embodiment

The structure of a vibration-type angular rate sensor 100 according to a first embodiment is now described with reference to FIG. 1. In this first embodiment, an example in which correction is performed by processing a sensor output of the vibration-type angular rate sensor 100 in an analog manner is described.

Figure 1:
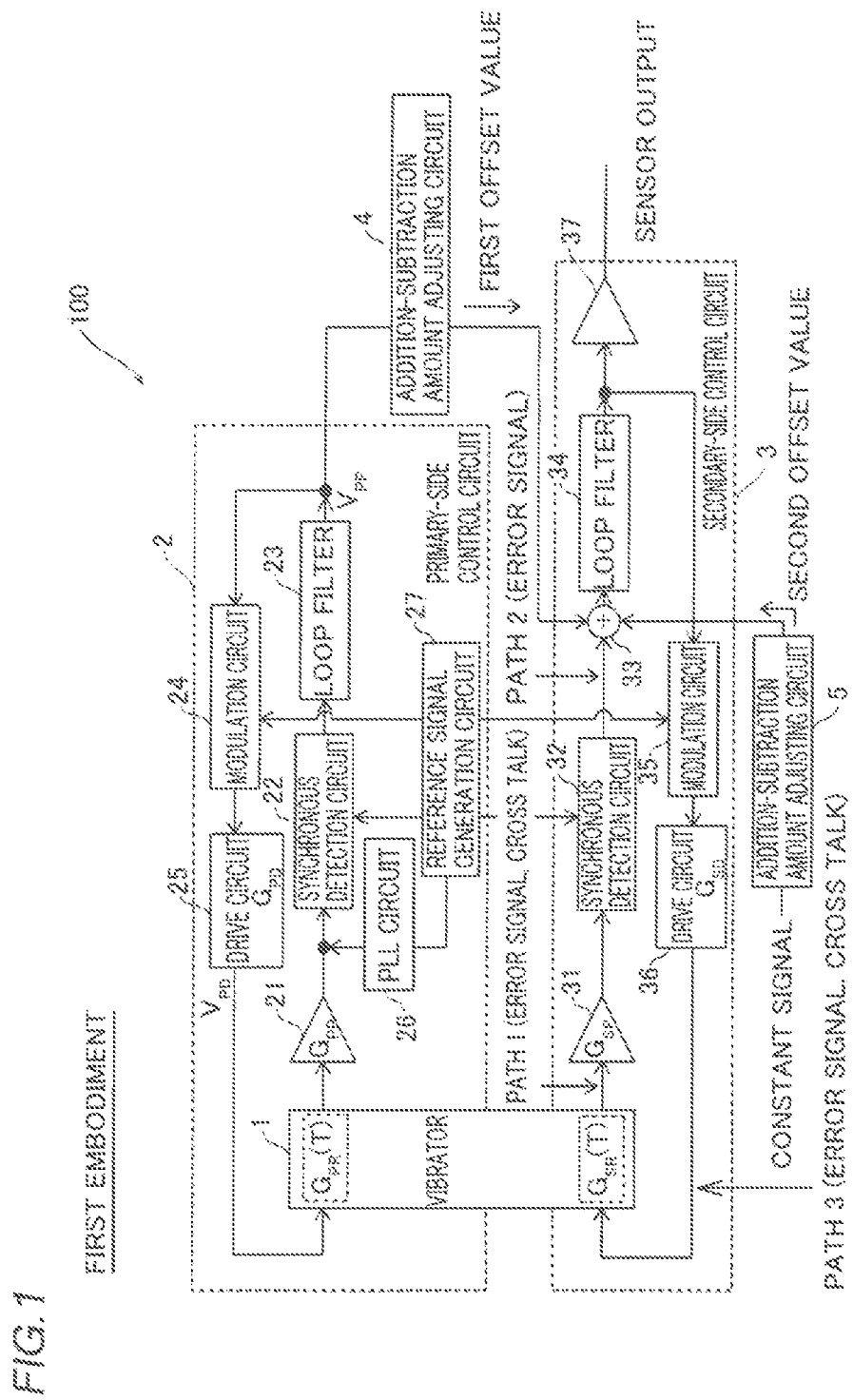
[FIG. 1] A block diagram showing the structure of a vibration-type angular rate sensor according to a first embodiment of the present invention.

As shown in FIG. 1, the vibration-type angular rate sensor 100 includes a vibrator 1, a primary-side control circuit 2 having a closed control loop that drives the vibrator 1 and a secondary-side control circuit 3 having a closed control loop that detects and outputs a vibration of the vibrator 1 driven by the primary-side control circuit 2. According to the first embodiment, the vibrator 1 includes a ring-type vibrator 1.

The primary-side control circuit 2 includes an amplifier circuit 21, a synchronous detection circuit 22, a loop filter 23, a modulation circuit 24, a drive circuit 25, a PLL (phase locked loop) circuit (phase synchronization circuit) 26, and a reference signal generation circuit 27. The vibrator 1, the amplifier circuit 21, the synchronous detection circuit 22, the loop filter 23, the modulation circuit 24, and the drive circuit 25 are connected to each other in this order, and constitute the closed control loop. The loop filter 23 includes an integral filter, for example. The loop filter 23 is an example of the "primary-side loop filter" in the present invention.

The secondary-side control circuit 3 includes an amplifier circuit 31, a synchronous detection circuit 32, an adder circuit 33, a loop filter 34, a modulation circuit 35, a drive circuit 36, and an amplifier circuit 37. The vibrator 1, the amplifier circuit 31, the synchronous detection circuit 32, the adder circuit 33, the loop filter 34, the modulation circuit 35, and the drive circuit 36 are connected to each other in this order, and constitute the closed control loop. The adder circuit 33 includes a common adder and subtracter using an operational amplifier. The loop filter 34 includes an integral filter, for example. An output of the loop filter 34 is input into the amplifier circuit 37. A signal output from the amplifier circuit 37 is output as a sensor output of the vibration-type angular rate sensor 100 to an external portion. The loop filter 34 is an example of the "secondary-side loop filter" in the present invention.

The vibration-type angular rate sensor 100 is provided with an addition-subtraction amount adjusting circuit 4 into which an output from the primary-side control circuit 2 (an output from the loop filter 23) is input. The addition-subtraction amount adjusting circuit 4 is configured to adjust the magnitude of the output of the loop filter 23 of the primary-side control circuit 2 dependent on temperature and input the adjusted output (first offset value) into the adder circuit 33 of the secondary-side control circuit 3. For example, the addition-subtraction amount adjusting circuit 4 adjusts the addition amount of the first offset value by dividing a voltage with a potentiometer (volume resistance) or the like.

The vibration-type angular rate sensor 100 is provided with an addition-subtraction amount adjusting circuit 5 into which a constant signal not dependent on temperature is input. The addition-subtraction amount adjusting circuit 5 is configured to adjust the magnitude of the constant signal and input the adjusted constant signal (constant second offset value) into the adder circuit 33 of the secondary-side control circuit 3. For example, the addition-subtraction amount adjusting circuit 5 adjusts the addition amount of the second offset value by dividing a voltage with a potentiometer (volume resistance) or the like.

According to the first embodiment, when the sensor output is corrected in an analog manner, the first offset value based on the output of the primary-side control circuit 2 (the output of the loop filter 23) dependent on temperature and the second offset value based on the constant signal not dependent on temperature are added to the closed control loop (an input of the loop filter 34 of the secondary-side control circuit 3) of the secondary-side control circuit 3, and the addition amounts of the first offset value and the second offset value are adjusted by the addition-subtraction amount adjusting circuit 4 and the addition-subtraction amount adjusting circuit 5, respectively, so that the sensor output (an output from the secondary-side control circuit 3) is corrected. The sensor output is corrected by determining and adding the first offset value and the second offset value to reduce an error in the sensor output caused in the closed control loop of the secondary-side control circuit 3 by an error signal generated from a circuit block constituting the secondary-side control circuit 3 and an error in the sensor output caused in the closed control loop of the secondary-side control circuit 3 by cross talk (signal crossing) from the primary-side control circuit 2 to the secondary-side control circuit 3. The correction is described later in detail.

Signals output from the amplifier circuits (21, 31), the synchronous detection circuits (22, 32), the loop filters (23, 34), the modulation circuits (24, 35), and the drive circuits (25, 36) are now described with reference to FIGS. 1 and 2.

Figure 2:
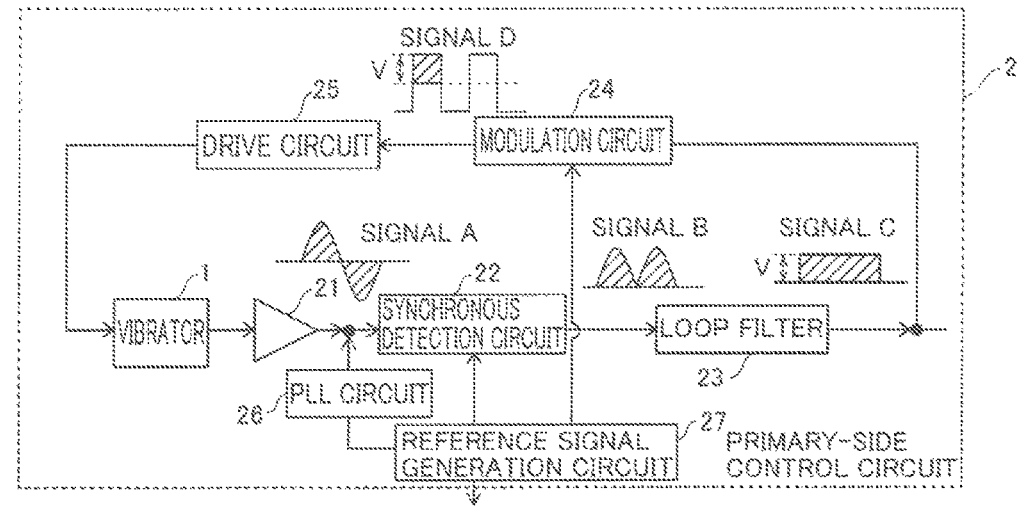
[FIG. 2] A diagram for illustrating a signal of the vibration-type angular rate sensor according to the first embodiment of the present invention.

As shown in FIG. 2, in the primary-side control circuit 2, a signal output from the vibrator 1 is amplified by the amplifier circuit 21 to become a signal A. The signal A amplified by the amplifier circuit 21 has a sine wave shape. In the reference signal generation circuit 27, a reference signal (synchronization signal) is generated, and the generated synchronization signal is output to the synchronous detection circuit 22 and the modulation circuit 24. The generated synchronization signal is also output to the synchronous detection circuit 32 and the modulation circuit 35 of the secondary-side control circuit 3 (see FIG. 1). The generated synchronization signal is also output to the PLL circuit 26.

Then, a signal having the same phase as the signal input into the PLL circuit 26 is input from the PLL circuit 26 into the synchronous detection circuit 22. Then, the signal A amplified by the amplifier circuit 21 is detected by the synchronous detection circuit 22 on the basis of the signal output from the PLL circuit 26 to become a signal B. Then, the signal B output from the synchronous detection circuit 22 is integrated by the loop filter 23 to become a signal C having a constant magnitude V. Then, the signal C is changed to a pulsed signal D by the modulation circuit 24 on the basis of the synchronization signal generated in the reference signal generation circuit 27. Then, the signal D pulsed by the modulation circuit 24 is input into the drive circuit 25, and the vibrator 1 is vibrated by the signal output from the drive circuit 25. A signal in the secondary-side control circuit 3 is similar to the signal in the primary-side control circuit 2.

An operation of detecting the angular velocity of the vibration-type angular rate sensor 100 is now described with reference to FIGS. 1, 3, and 4.

Figure 3:
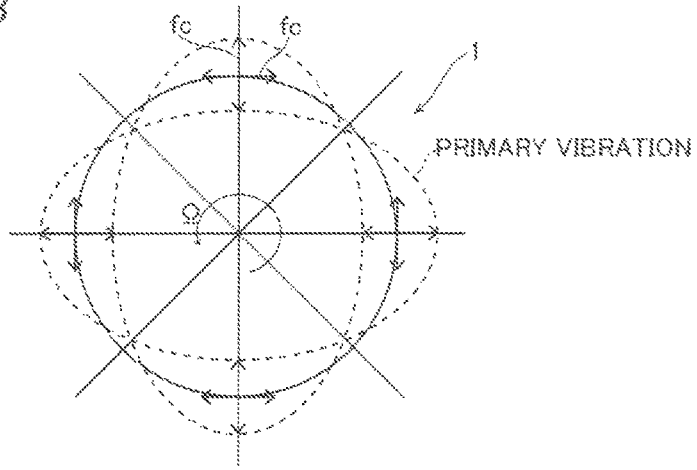
[FIG. 3] A diagram for illustrating a primary vibration of the vibration-type angular rate sensor according to the first embodiment of the present invention.
Figure 4:
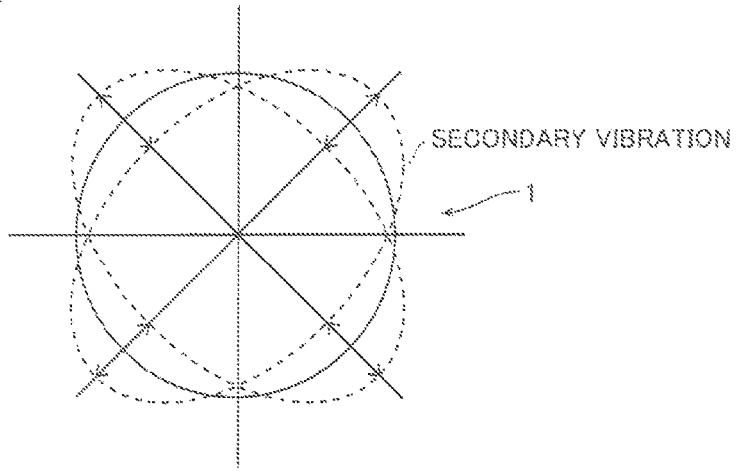
[FIG. 4] A diagram for illustrating a secondary vibration of the vibration-type angular rate sensor according to the first embodiment of the present invention.

First, a primary vibration (see a dotted line in FIG. 3) in a cos 2θ mode is generated in the vibrator 1 by the signal output from the drive circuit 25 of the primary-side control circuit 2 (see FIG. 1), as shown in FIG. 3. When an angular velocity Ω is generated about an axis (an axis perpendicular to the plane of the figure) perpendicular to the vibrator 1 in a state where the primary vibration is generated in the vibrator 1, a Coriolis force fc is generated. Thus, as shown in FIG. 4, a secondary vibration (see a dotted line in FIG. 4) in a sin 2θ mode is generated in the vibrator 1. Then, a signal (voltage) is input (applied) from the drive circuit 36 (see FIG. 1) of the secondary-side control circuit 3 into (to) the vibrator 1 so that the signal generated from the amplifier circuit 31 of the secondary-side control circuit 3 is reduced to zero by this secondary vibration. Then, the magnitude of this signal becomes a sensor output corresponding to the detected angular velocity.

The correction of the sensor output of the vibration-type angular rate sensor 100 is now described in detail with reference to FIG. 1.

First, an error in the output of the vibration-type angular rate sensor 100 to be corrected is described. As the error in the output of the vibration-type angular rate sensor 100, the error in the sensor output of the vibration-type angular rate sensor 100 caused by the error signal generated from the circuit block constituting the secondary-side control circuit 3 and the error in the sensor output of the vibration-type angular rate sensor 100 caused by an influence (cross talk) from the primary-side control circuit 2 exist. Assume that a component (error component) of the error signal generated from the circuit block constituting the secondary-side control circuit 3 is a constant value, which is not dependent on temperature. In general, in a feedback circuit, an output signal from each circuit is represented by a value obtained by dividing an input signal input into each circuit by a feedback gain (output signal=input signal×1/(feedback gain)).

An error component ($V_{In\_CE1}$: CE is an abbreviation for constant error) generated in a signal path 1 (path 1, a signal output from the vibrator 1) in FIG. 1 causes an output error $V_{Out\_CE1}$ expressed by the following expression. (2) by the feedback operation of the closed control loop of the secondary-side control circuit 3.

[Mathematical Expression 3]

$$V_{Out\_CE1} = \frac{V_{In\_CE1}}{G_{SD} \cdot G_{SR}(T)} = \frac{V_{In\_CE1}}{G_{SD}} \times \frac{1}{G_R(T)} = CE_1 \cdot \frac{1}{G_R(T)} \quad (2)$$

$G_{SD}$ represents a gain in the drive circuit 36 (secondary drive amplifier gain), which is a non-temperature-dependent value. $G_{SR}$ (T) represents a gain in the vibrator 1 (secondary resonator gain). This gain $G_{SR}$ (T) in the vibrator 1 is a value that varies depending on temperature. $G_{SR}$ (T) (=$G_{PR}$ (T); see an expression (7) described later) is equal to $G_R$ (T). $CE_1$ is a constant value, which is not dependent on temperature. More specifically, the output error $V_{Cut\_CE1}$ from the vibrator 1 becomes a value obtained by dividing the error signal $V_{In\_CE1}$ input into the vibrator 1 by the gain $G_{SD}$ in the drive circuit 36 and the gain $G_{SR}$ (T) in the vibrator 1. Thus, the output error $V_{Out\_CE1}$ from the vibrator 1 contains the gain $G_{SR}$ (T) ($G_R$ (T)) dependent on temperature, and hence the output error $V_{Out\_CE1}$ becomes a value that varies depending on temperature.

An error component ($V_{In\_CE2}$) generated in a signal path 2 (a path 2, a signal output from the synchronous detection circuit 32) also causes an output error $V_{Out\_CE2}$ expressed by the following expression (3), similarly to the above path 1.

[Mathematical Expression 4]

$$V_{Out\_CE2} = \frac{V_{In\_CE2}}{G_{SD} \cdot G_{SR}(T) \cdot G_{SP}} = \frac{V_{In\_CE2}}{G_{SD} \cdot G_{SP}} \times \frac{1}{G_R(T)} = CE_2 \cdot \frac{1}{G_R(T)} \quad (3)$$

$G_{SP}$ represents a gain in the amplifier circuit 31 (secondary pickoff amplifier gain), which is a non-temperature-dependent value. $CE_2$ is a constant value, which is not dependent on temperature. More specifically, the output error $V_{Out\_C2}$ from the synchronous detection circuit 32 becomes a value obtained by dividing the error signal $V_{In\_C2}$ input into the synchronous detection circuit 32 by the gain $G_{SD}$ in the drive circuit 36, the gain $G_{SR}$ (T) in the vibrator 1, and the gain $G_{SP}$ in the amplifier circuit 31. This output error $V_{Out\_CE2}$ also contains the gain $G_{SR}$ (T) ($G_R$ (T)) dependent on temperature, similarly to the above output error $V_{Out\_CE1}$, and hence the output error $V_{Out\_CE2}$ becomes a value that varies depending on temperature.

An error component ($V_{In\_CE3}$) generated in a signal path 3 (a path 3, a signal output from the drive circuit 36) causes an output error $V_{Out\_CE3}$ by the following expression (4).

[Mathematical Expression 5]

$$V_{Out\_CE3} = \frac{V_{In\_CE3}}{G_{SD}} = CE_3 \quad (4)$$

$CE_3$ is a constant value, which is not dependent on temperature. More specifically, the output error $V_{Out\_CE3}$ from the drive circuit 36 becomes a value obtained by dividing the error signal $V_{In\_CE3}$ input into the drive circuit 36 by the gain $G_{SD}$ in the drive circuit 36. The gain $G_{SD}$ in the drive circuit 36 is a value not dependent on temperature, as described above, and hence the output error $V_{Out\_CE3}$ (expression (4)) becomes a value not dependent on temperature.

The error in the sensor output of the vibration-type angular rate sensor 100 caused by the influence (cross talk) from the primary-side control circuit 2 of the output error of the vibration-type angular rate sensor 100 is now described. In the vibration-type angular rate sensor 100, the primary-side control circuit 2 (primary vibration) and the secondary-side control circuit 3 (secondary vibration) exist in the same element constituting the vibration-type angular rate sensor 100, and the electrical signal paths of the circuits are extremely close to each other, whereby the cross talk (signal crossing) from the primary-side control circuit 2 to the secondary-side control circuit 3 occurs. As the cross talk, the case where the drive signal $V_{PD}$ of the primary-side control circuit 2 (drive circuit 25) and the output signal $V_{PP}$ of the primary-side control circuit 2 (loop filter 23) are applied to the path 1 and the path 3 of the secondary-side control circuit 3 in a certain ratio is assumed. The path 2 is a path on an electronic circuit outside the same element constituting the primary-side control circuit 2 and the secondary-side control circuit 3, and hence no cross talk occurs.

An output error $V_{Out\_PP\_E1}$ caused by cross talk from the output signal $V_{PP}$ of the primary-side control circuit 2 (loop filter 23) to the path 1 is expressed by the following expression (5) when a ratio of the cross talk to the path 1 is assumed as α.

[Mathematical Expression 6]

$$V_{Out\_PP\_E1} = \frac{\alpha \cdot V_{PP}}{G_{SD} \cdot G_{SR}(T)} = PPE_1 \cdot \frac{1}{G_R(T)} \quad (5)$$

The output signal $V_{PP}$ is represented by $V_{SET}/G_{PP}$. $V_{SET}$ is a voltage (a value not dependent on temperature) for setting the amplitude amount of an alternating-current signal (vibrator 1) to a constant value, and $G_{PP}$ is a gain in the amplifier circuit 21 (primary pickoff amplifier gain) (a value not dependent on temperature). More specifically, the output signal $V_{PP}$ is a value not dependent on temperature. Thus, $\alpha \cdot V_{PP}/G_{SD}$, which is the right-hand side of the above expression (5), is viewed as a constant value $PPE_1$ not dependent on temperature. The output error $V_{Out\_PP\_E1}$ caused by the cross talk from the output signal $V_{PP}$ of the primary-side control circuit 2 to the path 1, which is expressed by the above expression (5), has properties (inversely proportional to $G_R$ (T) ($\infty$ $1/G_R$ (T))) similar to the above expression (2) that expresses an error caused by the error signal generated from the circuit block constituting the secondary-side control circuit 3. This is due to a high similarity between the control loop of the primary-side control circuit 2 and the control loop of the secondary-side control circuit 3. The control loops similar to each other denote control loops constituted by the same circuit blocks as each other and not including other circuit blocks having temperature properties. Even if the properties of the same circuit blocks as each other are different from each other (the amplification factors of the amplifier circuits are different from each other, for example), the circuit blocks are considered to be the same as each other.

The output error $V_{Out\_PP\_E3}$ caused by cross talk from the output signal $V_{PP}$ of the primary-side control circuit 2 to the path 3 is also expressed by the following expression (6), similarly to the above expression (4). This output error $V_{Out\_PP\_CE3}=PPE_3$ is a constant value not dependent on temperature.

[Mathematical Expression 7]

$$V_{Out\_PP\_E3}=PPE_3 \quad (6)$$

An output error $V_{Out\_PD\_E1}$ caused by cross talk from the drive signal $V_{PD}$ of the primary-side control circuit 2 (drive circuit 25) to the path 1 is expressed by the following expression (7) when a ratio of the cross talk is assumed as β.

[Mathematical Expression 8]

$$V_{Out\_PD\_E1} = \frac{\beta \cdot V_{PD}}{G_{SD} \cdot G_{SR}(T)} = \frac{\beta \cdot V_{SET}}{G_{PP} \cdot G_{SD} \cdot G_{PR}(T) \cdot G_{SP}(T)} = PDE_1 \cdot \frac{1}{G_R^2(T)} \quad (7)$$

The drive signal $V_{PD}$ is represented by $V_{SET}/(G_{PR}$ (T)·$G_{PP}$). $G_{PR}$ (T) is a gain in the vibrator 1 (primary resonator gain), and a value that varies depending on temperature. $G_{PR}$ (T) is equal to each of $G_{SR}$ (T) and $G_R$ (T). $PDE_1$ is a constant value not dependent on temperature. This expression (7) is an expression that is inversely proportional to the second power of $G_R$ (T) dependent on temperature, and hence the output error $V_{Out\_PD\_E1}$ becomes a value inversely proportional to the second power of the gain $G_R$ (T) dependent on temperature.

An output error $V_{Out\_PD\_E3}$ caused by cross talk from the drive signal $V_{PD}$ to the path 3 is expressed by the following expression (8). $PDE_3$ in this expression (8) is a constant value not dependent on temperature. The output error $V_{Out\_PD\_E3}$ caused by the cross talk from the drive signal $V_{PD}$ to the path 3, which is defined by this expression (8), becomes a value inversely proportional to $G_R$ (T) and dependent on temperature, similarly to the expression (5).

[Mathematical Expression 9]

$$V_{Out\_PD\_E3} = PDE_3 \cdot \frac{1}{G_R(T)} \quad (8)$$

The errors expressed by the above expressions (2) to (8) are accumulated into the sensor output of the vibration-type angular rate sensor 100, and hence an error obtained by adding all is expressed by the following expression (9). A, B, and C are constant values (coefficients) not dependent on temperature.

[Mathematical Expression 10]

$$V_{Out\_Total\_Error} = PDE_1 \cdot \frac{1}{G_R^2(T)} + \left(\frac{CE_1 + CE_2 +}{PPE_1 + PDE_3}\right) \cdot \frac{1}{G_R(T)} + \quad (9)$$
$$(CE_3 + PPE_3)$$
$$= A \cdot \frac{1}{G_R^2(T)} + B \cdot \frac{1}{G_R(T)} + C$$

The case where the sensor output is corrected in an analog manner for an error $V_{Out\_Total\_Error}$ in the sensor output of the vibration-type angular rate sensor 100 expressed by the above expression (9) is now described in detail.

First, $V_{In\_Const\_Corr}$ (second offset value) based on the constant signal not dependent on temperature is added to the input (path 2) of the loop filter 34 of the secondary-side control circuit 3. In this case, the sensor output $V_{Out\_Const\_Corr}$ of the vibration-type angular rate sensor 100 is expressed by the following expression (10).

[Mathematical Expression 11]

$$V_{Out\_Const\_Corr} = \frac{V_{In\_Const\_Corr}}{G_{SD} \cdot G_{SR}(T) \cdot G_{SP}} = p \cdot \frac{1}{G_R(T)} \quad (10)$$

When the second offset value based on the constant signal not dependent on temperature is added to the input of the loop filter 34, the sensor output $V_{Out\_Const\_Corr}$ becomes a value inversely proportional to the gain $G_R$ (T) dependent on temperature, as shown in the above expression (10). In the above expression (10), p is a constant value. Then, $V_{In\_Const\_Corr}$ (second offset value) is adjusted by the addition-subtraction amount adjusting circuit 5 such that p in the above expression (10) is equal in magnitude to B of $B/G_R$ (T), which is the second term in the above expression (9), (p=−B), whereby $B/G_R$ (T), which is the second term in the above expression (9), is canceled. More specifically, the second offset value based on the constant signal not dependent on temperature is adjusted and added to the input of the loop filter 34 so that the term inversely proportional to the second power of the gain $G_R$ (T) dependent on temperature in the above expression (9) can be canceled.

The output $V_{AGC}$ of the loop filter 23 of the primary-side control circuit 2, which is dependent on temperature, is expressed by the following expression (11). Unlike the above output signal $V_{PP}$ of the primary-side control circuit 2 (loop filter 23) not dependent on temperature, the output $V_{AGC}$ of the loop filter 23 is the output of the loop filter 23 obtained by taking into account the closed control loop, and becomes a value dependent on temperature.

[Mathematical Expression 12]

$$V_{AGC} = \frac{V_{SET}}{G_{PD} \cdot G_{PR}(T) \cdot G_{PP}} = \frac{V_{SET}}{G_{PD} \cdot G_{PP}} \times \frac{1}{G_{PR}(T)} = D \cdot \frac{1}{G_R(T)} \quad (11)$$

In the analog correction according to the first embodiment, in addition to $V_{In\_Const\_Corr}$ (second offset value) based on the constant signal not dependent on temperature, described above, a value (first offset value) obtained by multiply the output $V_{AGC}$ by a certain ratio q is added to the input (path 2) of the loop filter 34 of the secondary-side control circuit 3. When this first offset value is added, the sensor output $V_{Out\_AGC\_Corr}$ of the vibration-type angular rate sensor 100 is expressed by the following expression (12).

[Mathematical Expression 13]

$$V_{Out\_AGC\_Corr} = \frac{q \cdot V_{AGC}}{G_{SD} \cdot G_{SR}(T) \cdot G_{SP}} = \frac{q \cdot D}{G_{SD} \cdot G_{SP}} \cdot \frac{1}{G_R^2(T)} = r \cdot \frac{1}{G_R^2(T)} \quad (12)$$

When the first offset value based on the output of the primary-side control circuit 2 dependent on temperature is added to the input of the loop filter 34, the sensor output $V_{Out\_AGC\_Corr}$ becomes a value inversely proportional to the second power of the gain $G_R$ (T) dependent on temperature, as shown in the above expression (12). In the above expression (12), r is a constant value. Then, q is adjusted by the addition-subtraction amount adjusting circuit 4 such that r in the above expression (12) is equal in magnitude to A of $A/G_R^2$ (T), which is the first term containing the second power of $G_R$ (T) in the above expression (9), (r=−A), whereby $A/G_R^2$ (T), which is the first term in the above expression (9), is canceled. More specifically, whereas the sensor output of the vibration-type angular rate sensor 100 becomes a value obtained by adding the error expressed by the above expression (9) to the original sensor output when the sensor output is not corrected, according to the first embodiment, the first offset value (corresponding to the expression (12)) and the second offset value (corresponding to the expression (10)) are added so that the sensor output of the vibration-type angular rate sensor 100 becomes a value obtained by adding a constant value C to the original sensor output.

In the expression (9), C is a constant value not dependent on temperature, and hence no problem occurs in the correction. The coefficients A, B, and C in the above expression (9)

are calculated by measuring (actually measuring) the sensor output of the vibration-type angular rate sensor 100 before correction (compensation) at each temperature and performing polynomial approximation on the measured data by a least-square method. The coefficients A, B, and C are calculated for each vibration-type angular rate sensor 100 (each product).

In this manner, according to the first embodiment, the addition amount of the first offset value based on the output of the primary-side control circuit 2 dependent on temperature is adjusted such that $A/G_R^2$ (T), which is the first term in the expression (9), (the term inversely proportional to the second power of the gain $G_R$ (T) dependent on temperature) is reduced to zero, and the addition amount of the second offset value based on the constant signal not dependent on temperature is adjusted such that $B/G_R$ (T), which is the second term in the expression (9), (the term inversely proportional to the gain $G_R$ (T) dependent on temperature) is reduced to zero, whereby the sensor output is corrected in an analog manner.

Figure 5:
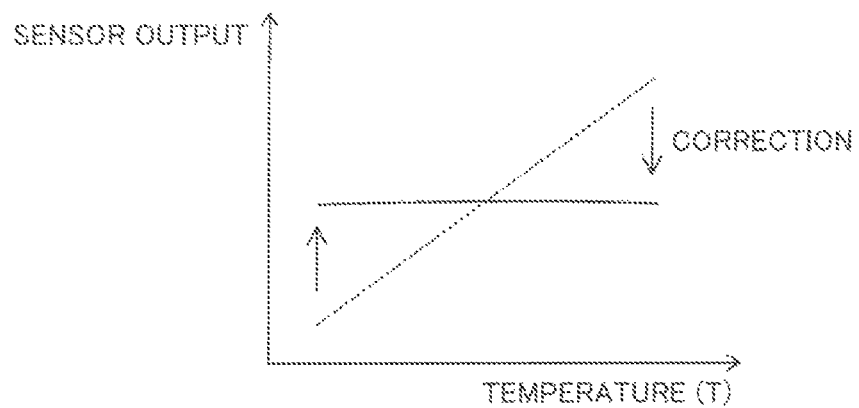
[FIG. 5] A diagram for illustrating correction (correction of a component proportional to $1/G_R(T)$ (the first power of temperature)) of a sensor output of the vibration-type angular rate sensor according to the first embodiment of the present invention.
Figure 6:
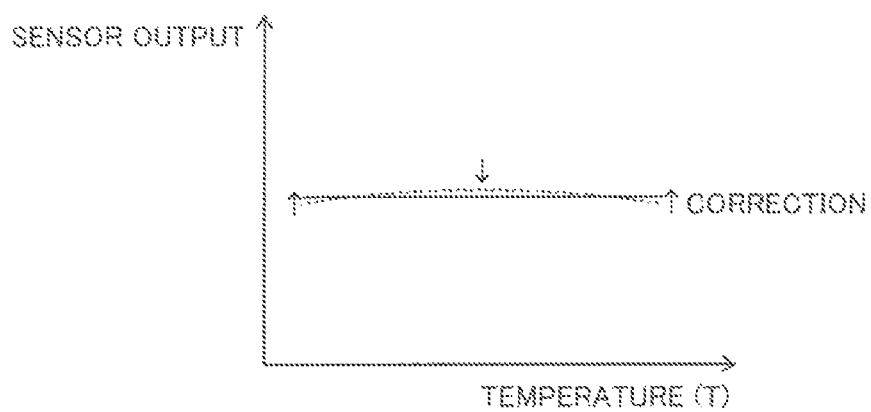
[FIG. 6] A diagram for illustrating correction (correction of a component proportional to $1/G_R^2(T)$ (the second power of temperature)) of a sensor output of the vibration-type angular rate sensor according to the first embodiment of the present invention.

More specifically, as shown in FIG. 5, a component (the second term in the expression (9)) proportional to $1/G_R$ (T) of the error in the sensor output of the vibration-type angular rate sensor 100 (the term inversely proportional to the gain $G_R$ (T) dependent on temperature) is canceled by adding the second offset value based on the constant signal not dependent on temperature, whereby the sensor output (a dotted line in FIG. 5) having properties dependent on temperature becomes substantially constant (a solid line in FIG. 5). However, as shown in FIG. 6, even the sensor output that has been made substantially constant microscopically has properties (a dotted line in FIG. 6) dependent on temperature. Therefore, a component (the first term in the expression (9)) proportional to $1/G_R^2$ (T) of the sensor output of the vibration-type angular rate sensor 100 (the term inversely proportional to the second power of the gain $G_R$ (T) dependent on temperature) is also canceled by adding the first offset value based on the output of the primary-side control circuit 2 dependent on temperature, whereby the sensor output becomes non-dependent on temperature and substantially constant (a solid line in FIG. 6). Consequently, the accuracy of the correction can be increased. When the sensor output of the vibration-type angular rate sensor 100 is corrected in an analog manner, the signal is a continuous value so that the sensor output of the vibration-type angular rate sensor 100 can be restrained from changing in a step manner (the sensor output can be a continuous value), unlike the case where the sensor output is corrected in a digital manner (the signal is a discrete value).

According to the first embodiment, the following effects can be obtained. The following is described assuming that a Q-value (a dimensionless number indicating a vibration state) generally has properties inversely proportional to temperature.

According to the first embodiment, as hereinabove described, the sensor output from the secondary-side control circuit 3 is corrected by adding the offset value (first offset value) based on the output of the closed control loop of the primary-side control circuit 2 dependent on temperature to the closed control loop of the secondary-side control circuit 3, whereby the sensor output can be corrected to reduce the error (particularly the error inversely proportional to the second power of the gain of the vibrator 1) caused by the cross talk from the primary-side control circuit 2 to the secondary-side control circuit 3.

According to the first embodiment, as hereinabove described, the sensor output is corrected by adding the offset value (first offset value) based on the output of the primary-side control circuit 2 dependent on temperature to the closed control loop of the secondary-side control circuit 3, whereby the temperature properties (the temperature properties of the vibration-type angular rate sensor 100 itself) of the gain of the control loop of the primary-side control circuit 2 can be directly reflected as temperature information in the closed control loop of the secondary-side control circuit 3 without using a temperature sensor. Thus, error factors, such as a difference in temperature properties and a difference in hysteresis between the temperature sensor and the vibration-type angular rate sensor 100, resulting from using the temperature sensor and do not occur, and correction in conformity with the more actual temperature properties of the vibration-type angular rate sensor 100 can be performed as compared with the case where the offset value is added on the basis of temperature indirectly measured by the temperature sensor. Consequently, correction can be performed without using the temperature sensor, and the accuracy of the correction can be increased.

According to the first embodiment, as hereinabove described, the sensor output is corrected by determining and adding the offset values (the first offset value and the second offset value) to reduce the error in the sensor output including the error in the sensor output caused in the closed control loop of the secondary-side control circuit 3 by the error signal generated from the circuit block constituting the secondary-side control circuit 3 and the error in the sensor output caused in the closed control loop of the secondary-side control circuit 3 by the cross talk from the primary-side control circuit 2 to the secondary-side control circuit 3. Thus, both the error caused by the error signal generated from the circuit block constituting the secondary-side control circuit 3 and the error caused by the cross talk are reduced by the correction, and hence the accuracy of the correction can be increased unlike the case where only one of the errors is reduced.

According to the first embodiment, as hereinabove described, the primary-side control circuit 2 and the secondary-side control circuit 3 include the loop filter 23 and the loop filter 34 in the closed control loops, respectively, and correct the sensor output by adding the offset value (first offset value) based on the output of the loop filter 23 dependent on temperature to the input of the loop filter 34. The output of the closed control loop corresponds to the output of the loop filter 23 (34). The output of the loop filter 23 (34) is inversely proportional to the gain of the vibrator 1 dependent on temperature by the feedback operation of the closed control loop. The gain of the vibrator 1 contains the Q-value (the dimensionless number indicating a vibration state). The Q-value generally has the properties inversely proportional to temperature, as described above. Consequently, the outputs of the loop filters have properties proportional to temperature. According to the first embodiment, focusing on this point, the sensor output is corrected by adding the offset value (first offset value) based on the output of the loop filter 23 dependent on temperature to the input of the loop filter 34, whereby the output of the loop filter 23 having the properties proportional to temperature can be utilized as temperature information, and hence correction can be performed without using the temperature sensor.

According to the first embodiment, as hereinabove described, when the sensor output is corrected in an analog manner, the sensor output is corrected by adding the first offset value based on the output of the primary-side control circuit 2 dependent on temperature and the second offset value based on the constant signal not dependent on temperature to the closed control loop of the secondary-side control circuit 3 and adjusting the addition amounts of the first offset value and the second offset value. When the second offset value based on the constant signal not dependent on temperature is added to the closed control loop of the secondary-side control circuit 3, the output of the secondary-side control circuit 3 has the properties (the properties inversely proportional to the Q-value ($\infty$ $1/Q_S$)) proportional to the first power of the temperature by the feedback operation of the closed control loop. $Q_S$ is a Q-value of the vibrator 1 in the secondary-side control circuit 3. This means that the output of the secondary-side control circuit 3 has the properties proportional to the first power of the temperature (the properties proportional to $1/Q_S$) when some value is added to the control loop of the secondary-side control circuit 3. Similarly, the output of the primary-side control circuit 2 also has the properties proportional to temperature (the properties inversely proportional to the Q-value ($\infty$ $1/Q_P$)) by the feedback operation of the closed control loop, and hence the output of the secondary-side control circuit 3 has the properties proportional to the second power of the temperature (inversely proportional to the second power of the Q-value ($\infty$ $1/(Q_P \cdot Q_S)$)) by adding the first offset value based on the output of the primary-side control circuit 2 having the properties proportional to $1/Q_P$ to the closed control loop of the secondary-side control circuit 3 having the output properties proportional to $1/Q_S$ of an additional value. $Q_P$ is a Q-value of the vibrator 1 in the primary-side control circuit 2. More specifically, the sensor output is corrected by adding the first offset value corresponding to the second power of the temperature and the second offset value corresponding to the first power of the temperature and adjusting the addition amounts of the first offset value and the second offset value, whereby not only the correction proportional to the first power of the temperature (inversely proportional to the first power of the gain of the vibrator 1) but also the correction proportional to the second power of the temperature (inversely to the second power of the gain of the vibrator 1) can be performed, and hence the accuracy of the correction can be further increased as compared with the case where the correction proportional to only the first power of the temperature is performed.

According to the first embodiment, as hereinabove described, the primary-side control circuit 2 and the secondary-side control circuit 3 include the loop filter 23 and the lop filter 34, respectively, and correct the sensor output in an analog manner by adding the first offset value based on the output of the loop filter 23 dependent on temperature and the second offset value based on the constant signal not dependent on temperature to the input of the loop filter 34 and adjusting the addition amounts of the first offset value and the second offset value. Thus, both the first offset value corresponding to the second power of the temperature (the second power of the gain of the vibrator 1) and the second offset value corresponding to the first power of the temperature the first power of the gain of the vibrator 1) can be easily reflected in the output of the loop filter 34, which is the output of the secondary-side control circuit 3 including the closed control loop.

According to the first embodiment, as hereinabove described, the total $V_{Out\_Total\_Error}$ of the error in the sensor output caused in the closed control loop of the secondary-side control circuit 3 by the error signal generated from the circuit block constituting the secondary-side control circuit 3 and the error in the sensor output caused in the closed control loop of the secondary-side control circuit 3 by the cross talk from the primary-side control circuit 2 to the secondary-side control circuit 3 is expressed by the above expression (9) when the gain of the vibrator 1 dependent on temperature is assumed as $G_R$ (T), and A, B, and C are assumed as the constant values not dependent on temperature, and the sensor output is corrected in an analog manner by adjusting the addition amount of the first offset value based on the output of the primary-side control circuit 2 dependent on temperature to reduce $A/G_R^2$ (T) (the term proportional to the second power of the temperature), which is the first term in the expression (9), to zero and adjusting the addition amount of the second offset value based on the constant signal not dependent on temperature to reduce $B/G_R$ (T) (the term proportional to the first power of the temperature), which is the second term in the expression (9), to zero. Thus, both the primary (the first power of the temperature, the first power of the gain of the vibrator 1) component and the secondary (the second power of the temperature, the second power of the gain of the vibrator 1) component of the error in the sensor output can be eliminated, and hence the accuracy of the correction can be reliably increased. Although the constant value C remains, C is the constant value not dependent on temperature, and hence the error in the sensor output caused by a temperature change is not influenced. Thus, no problem occurs in the correction.

According to the first embodiment, as hereinabove described, the vibrator 1 is the ring-type vibrator 1. The ring-type vibrator 1 has a symmetrical shape, and hence a vibration mode in the primary-side control circuit 2 and a vibration mode in the secondary-side control circuit 3 are similar to each other. Thus, the vibration-type angular rate sensor 100 includes the ring-type vibrator 1, whereby it is not necessary to take into account the influence of a difference between the vibration modes, and hence the sensor output can be easily corrected.

Second Embodiment

The structure of a vibration-type angular rate sensor 101 according to a second embodiment is now described with reference to FIG. 7. In the second embodiment, an example in which correction is performed by processing the output of a loop filter 23 of a primary-side control circuit 2 in a digital manner is described.

Figure 7:
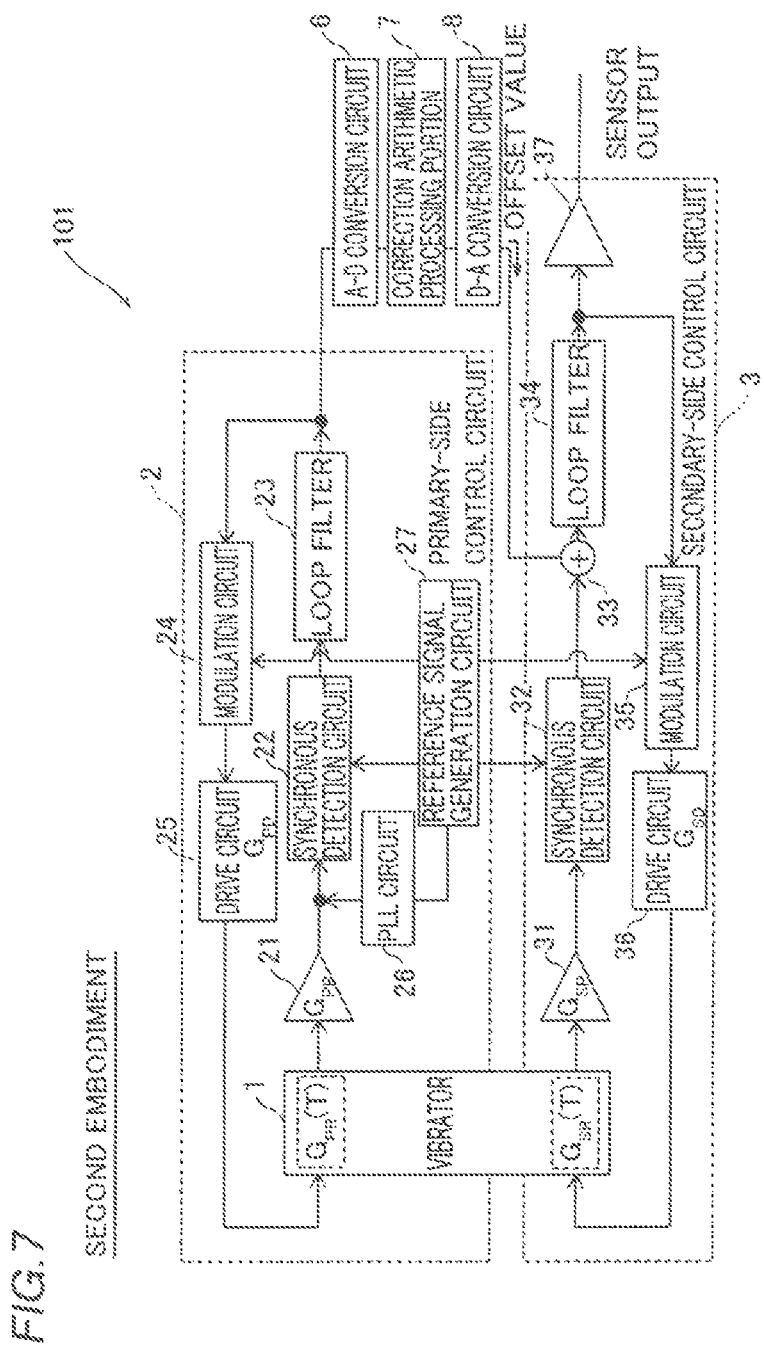
[FIG. 7] A block diagram showing the structure of a vibration-type angular rate sensor according to a second embodiment of the present invention.

As shown in FIG. 7, the vibration-type angular rate sensor 101 includes a vibrator 1, the primary-side control circuit 2, a secondary-side control circuit 3, an A-D conversion circuit 6, a correction arithmetic processing portion 7, and a D-A conversion circuit 8. The structures of the vibrator 1, the primary-side control circuit 2, and the secondary-side control circuit 3 are similar to those of the aforementioned first embodiment.

The A-D conversion circuit 6 is configured to receive an analog signal dependent on temperature, output from the loop filter 23 of the primary-side control circuit 2, convert (quantize) the analog signal to a digital signal, and output the digital signal to the correction arithmetic processing portion 7. According to the second embodiment, the correction arithmetic processing portion 7 is configured to output, to the D-A conversion circuit 8, an offset value for reducing an error in a sensor output caused by a temperature change to zero or substantially zero according to the quantized output an output from the A-D conversion circuit 6) of the primary-side control circuit 2. The D-A conversion circuit 8 is configured to convert the offset value into an analog signal and add the analog signal to the input of a loop filter 34 of the secondary-side control circuit 3. Thus, the vibration-type angular rate sensor 101 is configured to correct the sensor output.

The case where the sensor output is corrected in a digital manner is now described with reference to FIGS. 7 and 8. First, the offset value (y1, y2, . . . ; see FIG. 8) at each temperature (T1, T2, . . . ; see FIG. 8) for reducing the error (an error corresponding to the error defined by the above expression (9)) in the sensor output of the vibration-type angular rate sensor 101 to zero or substantially zero is searched by measuring the sensor output of the vibration-type angular rate sensor 101 while sweeping (changing to various values) the offset value (correction value) to be input into an adder circuit 33 of the secondary-side control circuit 3. More specifically, the offset value at each temperature is searched to reduce an error in the sensor output caused in a closed control loop of the secondary-side control circuit 3 by an error signal generated from a circuit block constituting the secondary-side control circuit 3 expressed by the expression (9) and an error in the sensor output caused in a closed control loop of the secondary-side control circuit 3 by cross talk (signal crossing) from the primary-side control circuit 2 to the secondary-side control circuit 3. Furthermore, the output (x1, x2, . . . ) from the primary-side control circuit 2 (loop filter 23) quantized by the A-D conversion circuit 6 with respect to each temperature (T1, T2, . . . ) is measured. Consequently, as shown in FIG. 8, the offset value (y) for reducing the error in the sensor output with respect to each temperature to zero or substantially zero and the output (x) from the primary-side control circuit 2 (loop filter 23) quantized at that time are obtained.

Then, the following expression (13) (1, m, and n are coefficients of constant values) is determined (calculated) by performing polynomial approximation on data shown in FIG. 8 by a least-square method, assuming the output from the primary-side control circuit 2 (loop filter 23) quantized at each temperature as x and the offset value as y. According to the second embodiment, a second-order polynomial is used, as shown in the following expression (13).

[Mathematical Expression 14]

$$y = lx^2 + mx + n \quad (13)$$

Consequently, a relational expression (expression (13)) between the offset value at each temperature and the output of the primary-side control circuit 2 quantized at each temperature is determined in advance (before the vibration-type angular rate sensor 101 is actually used). The relational expression is calculated for each vibration-type angular rate sensor 101 (each product). When the vibration-type angular rate sensor 101 is actually used, in the vibration-type angular rate sensor 101, correction is performed by calculating the offset value y by software in the correction arithmetic processing portion 7 with the above expression (13) according to the quantized output (x) of the primary-side control circuit 2 and adding the obtained offset value y to the secondary-side control circuit 3. More specifically, when the sensor output is corrected in a digital manner, calculation is constantly performed with the relational expression (expression (13)), and correction is constantly performed in response to the quantized output of the primary-side control circuit 2.

According to the second embodiment, although the output of the primary-side control circuit 2 is quantized (digitized) and the sensor output is corrected in a digital manner, the sensor output of the vibration-type angular rate sensor 101 is analog similarly to the first embodiment. Thus, an A-D converter can be arranged after the output of the vibration-type angular rate sensor 101. As the A-D converter, one optimal for required performance such as resolution and a conversion rate can be selected according to the use of the vibration-type angular rate sensor 101 (the range of choice is wide), and hence the versatility of the vibration-type angular rate sensor 101 can be increased as compared with the case where the sensor output is digital.

According to the second embodiment, the following effects can be obtained.

According to the second embodiment, as hereinabove described, when the sensor output is corrected in a digital manner, the sensor output is corrected by quantizing the output of the primary-side control circuit 2 dependent on temperature and adding, to the secondary-side control circuit 3, the offset value for reducing the error in the sensor output caused by a temperature change to zero or substantially zero according to the quantized output of the primary-side control circuit 2. Thus, the sensor output can be corrected simply by adding, to the secondary-side control circuit 3, the offset value for reducing the error in the sensor output caused by a temperature change to zero or substantially zero, and hence the structure of the vibration-type angular rate sensor 101 can be simplified, unlike the case where an offset value other than the offset value based on the output of the primary-side control circuit 2 dependent on temperature is added.

According to the second embodiment, as hereinabove described, the sensor output is corrected in a digital manner by calculating in advance the offset value for reducing the error in the sensor output to zero or substantially zero, determining the relational expression between the calculated offset value at each temperature and the quantized output of the primary-side control circuit 2 at each temperature by polynomial approximation, and adding the offset value to the secondary-side control circuit 3 on the basis of the determined relational expression. Thus, when correction is performed in a digital manner, the offset value can be calculated to further approximate the error in the sensor output to zero by increasing the degree of a polynomial, and hence the accuracy of the correction can be further increased. Furthermore, it is not necessary to separately provide a circuit or the like to remove a constant value C, unlike the case where the constant value C in the expression (1) remains when correction is performed in an analog manner as in the first embodiment, and hence the structure of the vibration-type angular rate sensor 101 can be simplified also in this regard.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the example of using the ring-type vibrator has been shown in each of the aforementioned first and second embodiments, the present invention is not restricted to this. For example, a disk-shaped, cup-shaped (wineglass-shaped), or octagon-shaped vibrator may be used so far as the vibrator has a symmetrical shape.

While the example in which the closed control loop includes the vibrator, the amplifier circuit, the synchronous detection circuit, the loop filter, the modulation circuit, and the drive circuit has been shown in each of the aforementioned first and second embodiments, the present invention is not restricted to this. For example, the control loop may include a structure other than the structure including the amplifier circuit, the synchronous detection circuit, the loop filter, the modulation circuit, and the drive circuit.

While the example in which the integral filter is used as the loop filter has been shown in each of the aforementioned first and second embodiments, a loop filter other than the integral filter may be used, for example.

While the example of adding the first offset value based on the output of the primary-side control circuit dependent on temperature and the second offset value based on the constant signal not dependent on temperature to the closed control loop of the secondary-side control circuit has been shown in the aforementioned first embodiment, the present invention is not restricted to this. For example, only the first offset value may be added to the closed control loop of the secondary-side control circuit. In this case, the accuracy of the correction is reduced as compared with the case where both the first offset value and the second offset value are added, but correction can be performed to some extent.

While the example of adjusting the addition amount of the first offset value to cancel (reduce to zero) $A/G_R^2$ (T) (the term inversely proportional to the second power of the gain $G_R$ (T) dependent on temperature), which is the first term in the expression (9), and adjusting the addition amount of the second offset value to cancel (reduce to zero) $B/G_R$ (T) (the term inversely proportional to the gain $G_R$ (T) dependent on temperature), which is the second term in the expression (9), has been shown in the aforementioned first embodiment, the first term and the second term in the expression (9) may not be canceled completely (may not be reduced to zero). More specifically, according to the present invention, the addition amount of the first offset value may be adjusted to reduce $A/G_R^2$ (T), which is the first term in the expression (9), to substantially zero, and the addition amount of the second offset value may be adjusted to reduce $B/G_R$ (T), which is the second term in the expression (9), to substantially zero.

While the example of determining the relational expression between the offset value for reducing the error in the sensor output to substantially zero and the quantized output of the primary-side control circuit at each temperature by second-order polynomial approximation has been shown in the aforementioned second embodiment, the present invention is not restricted to this. For example, a first-order polynomial or a third-order or higher polynomial may be used. Thus, such an offset value that the error in the sensor output is further approximated to zero can be obtained, and hence the accuracy of the correction can be increased.

DESCRIPTION OF REFERENCE SIGNS

1 Vibrator
2 Primary-side control circuit
3 Secondary-side control circuit
23 Loop filter (primary-side loop filter)
34 Loop filter (secondary-side loop filter)
100, 101 Vibration-type angular rate sensor

The invention claimed is:

1. A vibration-type angular rate sensor comprising:
a vibrator;
a primary-side control circuit including a closed control loop, of which an output induces a primary vibration in the vibrator; and
a secondary-side control circuit including a closed control loop that detects a secondary vibration generated in the vibrator due to an angular velocity applied to the vibrator, wherein
a sensor output from the secondary-side control circuit that is inversely proportional to a second power of a temperature change of a gain of the vibrator is corrected by adding, to the closed control loop of the secondary-side control circuit, an offset value based on the output of the closed control loop of the primary-side control circuit that is inversely proportional to the temperature change of the gain of the vibrator.

2. The vibration-type angular rate sensor according to claim 1, wherein
the primary-side control circuit and the secondary-side control circuit include a primary-side loop filter and a secondary-side loop filter in the closed control loops, respectively, and
the sensor output is corrected by adding, to an input of the secondary-side loop filter, the offset value based on an output of the primary-side loop filter that is inversely proportional to the temperature change of the gain of the vibrator.

3. The vibration-type angular rate sensor according to claim 1, wherein
when the sensor output is corrected in an analog domain, the sensor output is corrected by adding, to the closed control loop of the secondary-side control circuit, a first offset value based on the output of the primary-side control circuit that is inversely proportional to the temperature change of the gain of the vibrator to correct the sensor output that is inversely proportional to the second power of the temperature change of the gain of the vibrator from the secondary-side control circuit and a second offset value based on a constant signal that is not dependent on temperature to correct the sensor output that is inversely proportional to the temperature change of the gain of the vibrator from the secondary-side control circuit, and adjusting addition amounts of the first offset value and the second offset value.

4. The vibration-type angular rate sensor according to claim 3, wherein
the primary-side control circuit and the secondary-side control circuit include a primary-side loop filter and a secondary-side loop filter in the closed control loops, respectively, and
the sensor output is corrected in an analog domain by adding, to an input of the secondary-side loop filter, the first offset value based on an output of the primary-side loop filter that is inversely proportional to the temperature change of the gain of the vibrator and the second offset value based on the constant signal that is not dependent on temperature, and adjusting the addition amounts of the first offset value and the second offset value.

5. The vibration-type angular rate sensor according to claim 4, wherein
a total $V_{Out\_Total\_Error}$ of an error in the sensor output caused in the closed control loop of the secondary-side control circuit by an error signal generated from a circuit block constituting the secondary-side control circuit and an error in the sensor output caused in the closed control loop of the secondary-side control circuit by cross talk from the primary-side control circuit to the secondary-side control circuit is expressed by a following expression (1) when a gain of the vibrator that is dependent on temperature is considered as $G_R$ (T), and A, B, and C are constant values that is not dependent on temperature, and the sensor output is corrected in an analog domain by adjusting the additional amount of the first offset value based on the output of the primary-side control circuit that is inversely proportional to the temperature change of the gain of the vibrator to reduce $A/G_R^2$ (T), which is a first term in the expression (1), to zero or substantially zero, and adjusting the amount of the second offset value based on the constant signal that is not dependent on temperature to reduce $B/G_R(T)$, which is a second term in the expression (1), to zero or substantially zero.

[Mathematical Expression 1]

$$V_{Out\_Total\_Error} = A \cdot \frac{1}{G_R^2(T)} + B \cdot \frac{1}{G_R(T)} + C \quad (1)$$

6. The vibration-type angular rate sensor according to claim 1, wherein
when the sensor output is corrected in a digital domain, the sensor output is corrected by quantizing the output of the primary-side control circuit that is inversely proportional to the temperature change of the gain of the vibrator, and adding, to the secondary-side control circuit, the offset value for reducing an error in the sensor output caused by a temperature change to zero or substantially zero according to the quantized output of the primary-side control circuit.

7. The vibration-type angular rate sensor according to claim 6, wherein
the sensor output is corrected in a digital domain by calculating in advance the offset value for reducing the error in the sensor output to zero or substantially zero at each temperature, determining a relational expression between the calculated offset value at each temperature and the quantized output of the primary-side control circuit at each temperature by polynomial approximation, and adding the offset value to the secondary-side control circuit on the basis of the determined relational expression.

8. The vibration-type angular rate sensor according to claim 1, wherein
the vibrator includes a ring-type vibrator.

* * * * *